(12) United States Patent
Su et al.

(10) Patent No.: US 9,300,756 B2
(45) Date of Patent: Mar. 29, 2016

(54) IDENTITY CROWD-SOURCED CURATION

(71) Applicant: Google Inc., Mountain View, CA (US)

(72) Inventors: Sara Lee Su, San Jose, CA (US); Gregory Dardyk, Kiryat Ono (IL); Michael Brandt, San Francisco, CA (US); Jonathan McPhie, Mountain View, CA (US); Umesh Shankar, New York, NY (US); Marlo James McGriff, II, Windsor, CT (US); Jose Javier Zuniga, Jr., Mountain View, CA (US); Mor Miller, Raanana (IL); Travis Harrison Kroll Green, Washington, DC (US); Tomer Amarilio, Kiriat Ata (IL); Brandon Kyle Trew, San Francisco, CA (US); Hristo Stefanov Stefanov, Mountain View, CA (US); Christoph Urs Oehler, Luzern (CH); Dan Fredinburg, Mountain View, CA (US); Andrew Swerdlow, San Francisco, CA (US); Etienne DeGuine, San Francisco, CA (US); Giora Unger, Haifa (IL); Max Michiel Loubser, New York, NY (US); Kyle Garner Harrison, Los Altos, CA (US); Lars Fabian Kruger, Zurich (CH); Peter Tomlinson Klein, San Francisco, CA (US); Si-Wai Yan Lai, Mountain View, CA (US); Joseph Adam Taylor, Cupertino, CA (US); Alison Michelle Huml, Moutain View, CA (US); Tilke Mary Judd, Zurich (CH); Bao Lam, Mountain View, CA (US); Geva Rechav, Mountain View, CA (US); Mark Russell Thomas, San Francisco, CA (US); Lauren A. Schmidt, Mountain View, CA (US)

(73) Assignee: Google Inc., Mountain View, CA (US)

(*) Notice: Subject to any disclaimer, the term of this patent is extended or adjusted under 35 U.S.C. 154(b) by 206 days.

(21) Appl. No.: 14/024,423

(22) Filed: Sep. 11, 2013

(65) Prior Publication Data

US 2014/0095614 A1  Apr. 3, 2014

Related U.S. Application Data

(60) Provisional application No. 61/707,834, filed on Sep. 28, 2012.

(51) Int. Cl.
*G06F 15/16* (2006.01)
*H04L 29/08* (2006.01)
*G06Q 50/02* (2012.01)

(52) U.S. Cl.
CPC .............. *H04L 67/306* (2013.01); *G06Q 50/02* (2013.01); *H04L 67/02* (2013.01); *H04L 67/22* (2013.01)

(58) Field of Classification Search
CPC ........ G06Q 50/01; H04L 67/02; H04L 67/22; H04L 67/306
See application file for complete search history.

(56) References Cited

U.S. PATENT DOCUMENTS

| 8,650,177 B2* | 2/2014 | Skomoroch et al. .......... 707/710 |
| 2009/0031232 A1 | 1/2009 | Brezina et al. |

(Continued)

OTHER PUBLICATIONS

Rao, Leena, "LinkedIn Debuts Endorsements As a Lightweight Way to Recommen a Professional Contact's Skills", Sep. 24, 2012, TechCrunch, p. 1.*

(Continued)

*Primary Examiner* — Jonathan Bui
(74) *Attorney, Agent, or Firm* — McDermott Will & Emery LLP

(57) ABSTRACT

A method includes gathering a plurality of instances of online activity associated with a user, analyzing the plurality of instances of online activity to determine a characteristic that is likely to correspond to a profile attribute of the user and generating a profile enrichment suggestion for the user based on the determined characteristic.

21 Claims, 5 Drawing Sheets

(56) References Cited

U.S. PATENT DOCUMENTS

| | | |
|---|---|---|
| 2009/0241035 A1 | 9/2009 | Tseng et al. |
| 2010/0146118 A1* | 6/2010 | Wie .............................. 709/225 |
| 2011/0029521 A1 | 2/2011 | Thayne et al. |
| 2012/0191777 A1 | 7/2012 | Iwasaki et al. |
| 2012/0203846 A1 | 8/2012 | Hull et al. |
| 2012/0239486 A1 | 9/2012 | Hu et al. |
| 2013/0030987 A1 | 1/2013 | Zuckerberg et al. |
| 2013/0238686 A1 | 9/2013 | O'Donoghue et al. |
| 2013/0282813 A1* | 10/2013 | Lessin et al. .................. 709/204 |
| 2014/0025427 A1* | 1/2014 | Bastian et al. ............... 705/7.29 |
| 2014/0089320 A1* | 3/2014 | Baldwin et al. ............... 707/748 |

OTHER PUBLICATIONS

Viveka, "LinkedIn Skills get more Klout (with new Endorsements)", Sep. 24, 2012, Linked Into Business, pp. 1-3.*

* cited by examiner

IDENTITY CROWD-SOURCED CURATION

CROSS-REFERENCE TO RELATED APPLICATIONS

The present application claims the benefit of priority under 35 U.S.C. §119 from U.S. Provisional Patent Application Ser. No. 61/707,834, filed on Sep. 28, 2012, the disclosure of which is hereby incorporated by reference in its entirety for all purposes.

BACKGROUND

Users may not create rich online profiles because creating a rich online profile may take significant time and effort.

SUMMARY

The subject disclosure relates generally to electronic communications, and more particularly to providing online profile enrichment suggestions for a user. The subject disclosure relates to a machine-implemented method for providing online profile enrichment suggestions for a user. The method includes gathering a plurality of instances of online activity associated with a user, analyzing the plurality of instances of online activity to determine a characteristic that is likely to correspond to a profile attribute of the user and generating a profile enrichment suggestion for the user based on the determined characteristic.

These and other aspects may include one or more of the following features. The method may include determining a contact associated with the user for making the generated suggestion to the user and providing the generated suggestion to the determined contact for sending to the user.

The profile enrichment suggestion may be generated for the user in response to a request for the profile enrichment suggestion received from a contact associated with the user. The generated suggestion may be provided to the contact associated with the user, for sending the generated suggestion to the user.

The profile enrichment suggestion may be generated for the user in response to a request for the profile enrichment suggestion received from the user. The generated suggestion may be provided to the user.

The method may also include identifying the user for receiving the profile enrichment suggestion and determining that the user is a candidate for receiving the profile enrichment suggestion.

The method may furthermore include identifying a plurality of profile attributes in the user's existing profile, determining the characteristic based on the plurality of profile attributes in the user's existing profile, determining whether the determined characteristic fits within at least one profile attribute of the plurality of profile attributes in the user's existing profile and, in a case the determined characteristic does not fit within at least one profile attribute of the plurality of profile attributes, creating a new profile attribute for the user.

The online activity of a user includes public online activity of the user or private online activity of the user.

The disclosed subject matter also relates to a machine-readable storage medium comprising instructions stored therein, which when executed by the processors, cause the processors to perform operations that include receiving an indication of a selection, by a first user, of a characteristic for an online profile attribute of a second user, generating an online profile enrichment suggestion for the second user based on the received indication of the selection and providing the online profile enrichment suggestion to the second user.

These and other aspects may include one or more of the following features. The operations may further include determining whether the first user is a reliable source of the online profile enrichment suggestion and providing the online profile enrichment suggestion to the second user when the first user is determined to be a reliable source of the online profile enrichment suggestion.

The operations may also include determining whether the characteristic selected by the first user is redundant for the second user's online profile and providing the online profile enrichment suggestion to the second user when the characteristic selected by the first user is not redundant.

The operations may still further include determining whether the characteristic selected by the first user fits into an existing online profile attribute of the second user and in a case the characteristic selected by the first user fits into the existing online profile attribute, adding the selected characteristic to the existing online profile attribute of the second user.

The operations may furthermore include creating an online profile attribute corresponding to the selected characteristic, in a case the characteristic selected by the first user does not fit into the existing online profile attribute of the second user.

The disclosed subject matter further relates to a system that includes a characteristics module configured to analyze a plurality of instances of online activity to determine a characteristic that is likely to correspond to an online profile attribute of a user and a suggestion module configured to generate an online profile enrichment suggestion for the user based on the determined characteristic.

These and other aspects may include one or more of the following features. The system may also include an activity module configured to gather the plurality of instances of online activity associated with the user, the plurality of instances of online activity used for determining the characteristic that is likely to correspond to the online profile attribute of the user and a suggestion filtering module configured to determine one or more of, whether the determined characteristic is redundant for the online profile of the user and provide the online profile enrichment suggestion to the when the determined characteristic is not redundant, or whether the determined characteristic fits into an existing online profile attribute of the user and, in a case the determined characteristic fits into the existing online profile attribute, add the determined characteristic to the existing online profile attribute of the second user, otherwise, create a new online profile attribute corresponding to the determined characteristic.

These and other aspects may provide one or more of the following advantages. Online profiles are richer and better resemble the individual with whom they are associated. Setting up the profile requires less effort and is less time consuming. Users who are unable to fill out a rich online profile are better able to capture their identity. Also, the user or the user' contacts may participate in generating a profile enrichment suggestion for the user.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

Certain features of the subject technology are set forth in the appended claims. However, for purpose of explanation, several implementations of the subject technology are set forth in the following figures.

DETAILED DESCRIPTION

Figure 1:
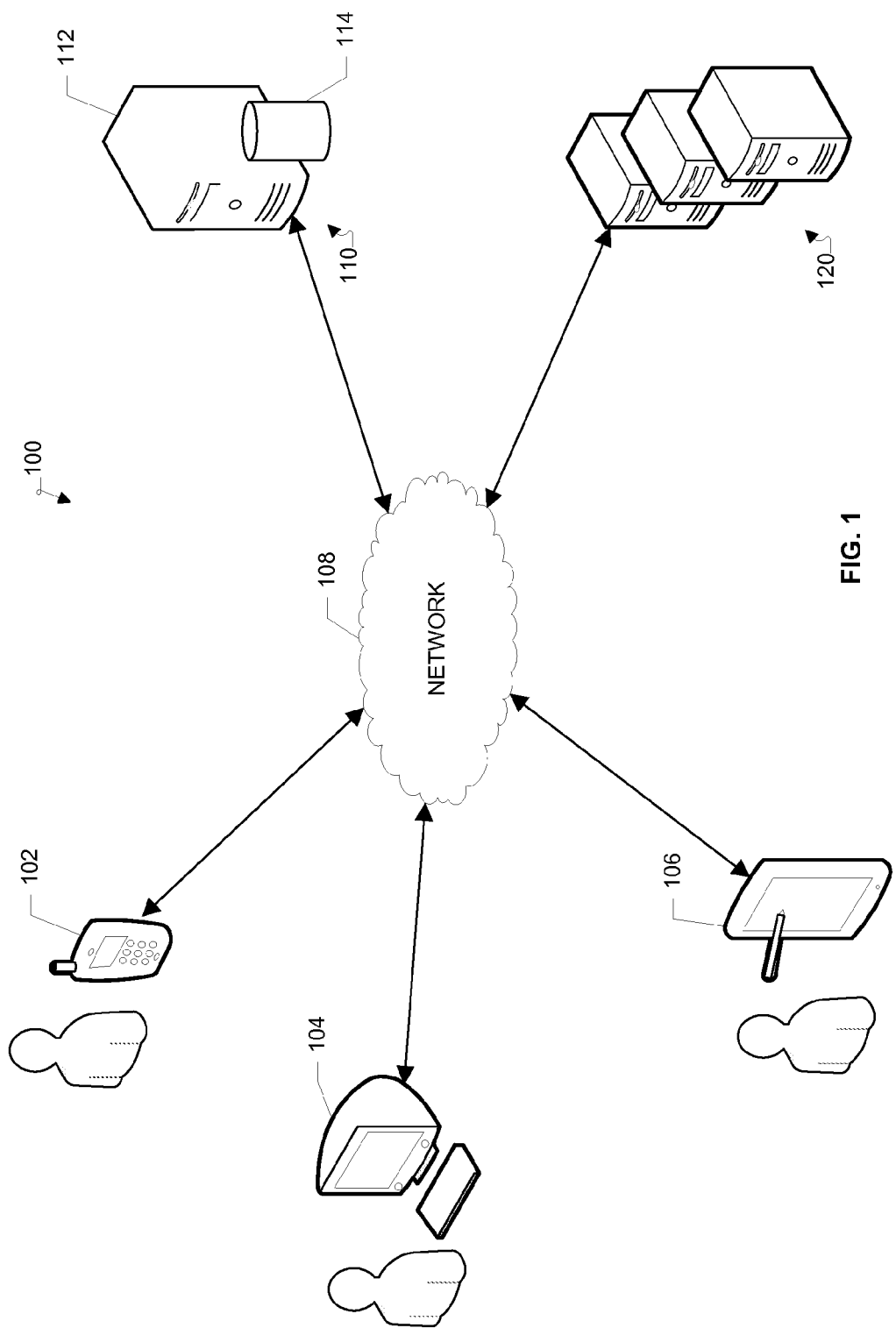
FIG. 1 is a diagram of an example system for providing online profile enrichment suggestions for a user.

In the following detailed description, numerous specific details are set forth to provide a full understanding of the present disclosure. It will be apparent, however, that the implementations of the present disclosure may be practiced without some of these specific details. In other instances, structures and techniques have not been shown in detail so as not to obscure the disclosure.

Social networks and other online communities use online profiles to identify their users. Each profile uniquely identifies a person or, in some cases, a group. The online profile is intended to accurately represent a real-world person online. The more developed a user's online profile, the richer the user's experience is online. However, many users do not create rich online profiles because creating a rich online profile may take significant time and effort.

Methods and systems for providing online profile enrichment suggestions for a user are provided herein. The disclosed technology allows a user's contacts or a system such as a social network to make profile enrichment suggestions for the user, in order to improve the user's online identity and experience. The suggestions may be based on the user's online activities such as, but not limited to, the user's existing online profile information as entered by the user, the user's posts, the user's stream, chats, group affiliations, affirmations of content, etc. Changes to a user's activity pattern may also form a basis for a suggestion. For example, when a user typically discusses a topic in private, but a series of public communications about the same topic is observed, the topic may be a potential profile attribute. The system may suggest that the user add that topic as a profile attribute.

The profile enrichment suggestion may be initiated by the user, a user's contact or the system. For example, a user may solicit help in filling out his or her online profile from his or her contacts. In response to the solicitation request, the system may periodically generate suggestions and send the suggestions to user's contacts for providing to the user. The system may rank which contacts are better for providing suggestions to the user. For example, contacts with rich online profiles and high affinity scores may be ranked higher.

Alternatively, the system may determine that a user's online profile is sparse and determine that suggestions should be generated for the user. The system may provide the generated suggestions directly to the user. Alternatively, a profile enrichment suggestion may be provided by the system to one or more of the user's contacts, to enable the contacts to make the suggestion to the user.

In operation, regardless of where the request for an online profile enrichment suggestion originates, the system identifies a user for receiving online profile enrichment suggestions. The user may be identified by the system, a user's contacts or as a result of the user's own request for profile enrichment suggestions. The system identifies a plurality of instances of the user's online activity. For example, the online activity such as public posts, private messages, emails, group affiliations, affirmations of content, etc. is identified for analysis by the system.

The online activity is analyzed to determine a characteristic that is likely to be an online profile attribute of the user. That is, the system determines whether the online activity is something that may be worth pinning to the user's online profile. An activity that suggests an interest, a hobby, a music preference, education, employment or the like may be some of the characteristics that are deemed likely to be an online profile attribute of the user. Determining a characteristic that is likely to be an online profile attribute of the user may include identifying a plurality of existing profile attributes of the user. That is, the user's existing profile may be analyzed to determine areas that are filled out and areas that are sparse in information. A characteristic that addresses a sparse area may be preferable to a characteristic that addresses an area of the profile that is filled out.

Based on the characteristics, the system generates an online profile enrichment suggestion for the user. The suggestion includes an attribute that corresponds to the determined characteristic. The generated suggestions may be provided to the user or to one or more of the user's contacts who, in turn, provides the suggestion to the user.

It is understood that other configurations of the subject technology will become readily apparent from the following detailed description, where various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

FIG. 1 illustrates an example client-server network that provides for providing online profile enrichment suggestions for a user. A network 100 includes a number of electronic devices 102, 104 and 106 communicably connected to a server 110 by a network 108. Server 110 includes a processing device 112 and a data store 114. Processing device 112 executes computer instructions stored in data store 114, for example, instructions to identify a user for receiving a profile enrichment suggestion, gathering instances of online activity associated with a user, analyzing the online activity to determine a characteristic that is likely to correspond to a profile attribute of the user and generating a profile enrichment suggestion for the user based on the characteristic.

Data store 114 may also store a user's existing profile and related attributes. Server 110 or application servers 120 may host an application within which some of the processes discussed herein are implemented. For example, server 110 or application servers 120 may analyze a user's online activity to determine a characteristic that is likely to correspond to a profile attribute. The profile, as used herein, is an online profile or a profile that is communicated to a system that is online.

The server 110 or application servers 120 may cause a system to gather instances of online activity associated with a user. The server 110 or application servers 120 may also determine a contact associated with the user, for making the suggestion to the user. The server 110 or application servers 120 may cause a suggestion to be generated.

In some example aspects, electronic devices or client devices, as used interchangeably herein, 102, 104 and 106 can be computing devices such as smartphones, PDAs, portable media players, tablet computers, televisions or other displays with one or more processors coupled thereto or embedded therein, or other appropriate computing devices that can be used for running an application.

Electronic devices 102, 104 and 106 may have one or more processors embedded therein or attached thereto, or other appropriate computing devices that can be used for accessing a host, such as server 110. In the example of FIG. 1, electronic device 102 is depicted as a smartphone, electronic device 104 is depicted as a tablet computer, and electronic device 106 is depicted as a PDA. A client is an application or a system that accesses a service made available by a server which is often (but not always) located on another computer system accessible by a network. Some client applications may be hosted on a website, whereby a browser is a client. Such implementations are within the scope of the subject disclosure, and any reference to client may incorporate a browser and reference to server may incorporate a website.

Application servers 120 are in communication with the electronic devices 102, 104 and 106 through network 108. Each electronic device 102, 104 and 106 may be a client device or a host device. In some example aspects, server 110 can be a single computing device such as a computer server. In other implementations, server 110 can represent more than one computing device working together to perform the actions of a server computer (e.g., cloud computing). The server 110 may host the web server communicationally coupled to the browser at the client device (e.g., electronic devices 102, 104 or 106) via network 108.

The network 108 can include, for example, any one or more of a personal area network (PAN), a local area network (LAN), a campus area network (CAN), a metropolitan area network (MAN), a wide area network (WAN), a broadband network (BBN), the Internet, and the like. Further, the network 108 can include, but is not limited to, any one or more of the following network topologies, including a bus network, a star network, a ring network, a mesh network, a star-bus network, tree or hierarchical network, and the like.

Figure 2:
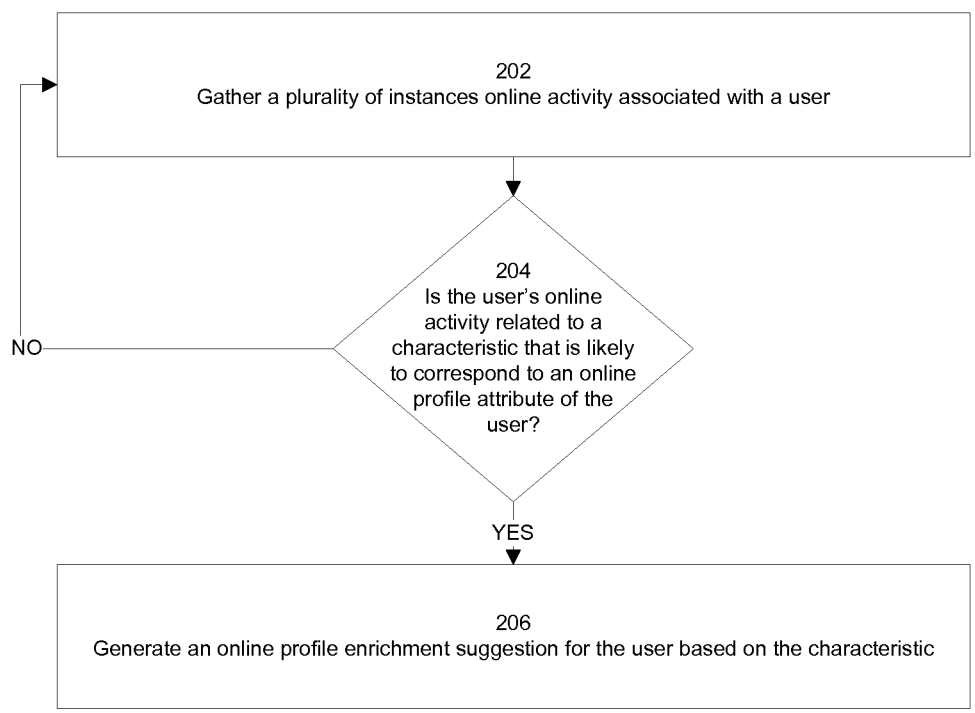
FIG. 2 illustrates a flow diagram of an example process for providing online profile enrichment suggestions for a user.

FIG. 2 illustrates a flow diagram of an example process 200 for providing online profile enrichment suggestions for a user. At block 202 the system gathers a plurality of instances of online activity associated with a user. Online activity includes, but is not limited to, the user's public posts, the user's stream, chats, group affiliations, affirmations of content, etc. Changes to a user's activity pattern may also serve as online activity.

According to one aspect of the disclosed subject matter, the online activity associated with a user may be gathered in response to the user requesting the system to provide a profile enrichment suggestion to the user. That is, the user may determine that his or her online profile is sparse and request automated profile enrichment suggestions to fill out his or her profile. Such requests may be made by the user periodically, triggering the system to periodically gather online activity. Alternatively, a request to receive profile enrichment suggestions may be made once, and the online activity may be gathered on an on-going basis, until the user requests that the system stop providing him or her with profile enrichment suggestions.

According to another aspect, the online activity associated with a user may be gathered in response to a request from a third party, such as a contact associated with the user, to receive a profile enrichment suggestion for the user. The contact associated with the user may provide the profile enrichment suggestion to the user.

According to yet another aspect, the system may identify users for receiving profile enrichment suggestions. That is, the system may determine that a user (or a group of users) is a candidate for receiving a profile enrichment suggestion. A particular user may be determined to be a candidate when, for example, the user has a sparse profile and would benefit from receiving suggestions regarding how to make the user's profile better reflect him or her. To that end, the system may gather the instances of online activity of a user in response to a system's identification of a user selected for such task. The system may then make the profile enrichment suggestion to the user. Alternatively, the system may identify a contact associated with the user, for making the suggestion to the user.

At block 204, the online activity is analyzed to determine whether the online activity is related to a characteristic that is likely to correspond to an online profile attribute of the user. That is, the system determines whether the online activity describes or captures a characteristic that may be worth pinning to the user's online profile. An activity that suggests an interest, a hobby, a music preference, education, employment or the like may be some of the characteristics that are deemed likely to be an online profile attribute of the user. For example, activity about the user asking directions, attending a wedding, or posting about traffic may be deemed unlikely to relate to a characteristic that is likely to correspond to an online profile attribute. Posts about a concert, a seminar or a school reunion may be deemed related to a characteristic that is likely to correspond to an online profile attribute.

Determining a characteristic that is likely to be an online profile attribute of the user may include identifying a plurality of existing profile attributes of the user. Also, the user's existing profile may be analyzed to determine areas that are filled out and areas that are sparse on information. A characteristic that addresses a sparse area may be preferable as a subject of a profile enrichment suggestion to a characteristic that addresses an area of the profile that is amply filled out.

When a particular online activity repeatedly highlights a characteristic that is likely to correspond to an online profile attribute of the user, the system may further determine whether the corresponding online profile attribute exists and whether the profile attribute is filled out. If the system determines that the corresponding profile attribute does not already exist, the system may create the corresponding profile attribute. When a profile attribute is filled out with a lot of information, the system may suppress a characteristic and not promote it as a possible subject of a profile enrichments suggestion. In other words, there may be a mechanism for favoring profile attributes that are in need of filling out to the profile attributes that are full of information.

If it is determined that the online activity is not related to a characteristic that corresponds to an online profile attribute of the user, the process may end or go back to block 204. When it is determined that the online activity is related to a characteristic that corresponds to an online profile attribute of the user, the process continues to block 206.

At block 206, the system generates an online profile enrichment suggestion for the user based on the characteristic that is determined to be likely to correspond to an online profile attribute of the user. The suggestion may include the determined characteristic. The suggestion may also include a reason for why the suggestion is generated. For example, there may be a correlation presented between the user's online activity and how it relates to a particular online profile attribute. The generated suggestion may be provided to the user or to one or more of the user's contacts who, in turn, provides the suggestion to the user.

Providing the generated suggestion may further include determining who or what triggered generating the suggestion. For example, in a case the system selects a user for receiving a profile enrichment suggestion, the generated suggestion may be provided directly to the user. Alternatively, in a case the system selects a user for receiving a profile enrichment suggestion, the generated suggestion may be provided to a contact associated with the user. The system may determine a contact who is a good candidate for making such a suggestion. For example, the system may look for a contact who has a high affinity score, vicinity score, or the like, as it relates to the user. Contacts may also be determined based on having a similar characteristic in the profile. That is, a contact associated with a user who also has the same characteristic in the online profile may be preferable to a contact who has nothing to do with the characteristic. The system may identify a group of contacts who are deemed by the system to be good suggestors, and send profile enrichment suggestions to the contacts in the group. The user may be more likely to accept a profile enrichment suggestion when it is made by a contact associated with the user.

In a case the user requests to receive a suggestion, the generated suggestion is, likewise, provided to the user. In a case a contact associated with the user requested that a suggestion be generated for the user, the generated suggestion may be provided to either directly to the user or the contact associated with the user.

Figure 3:
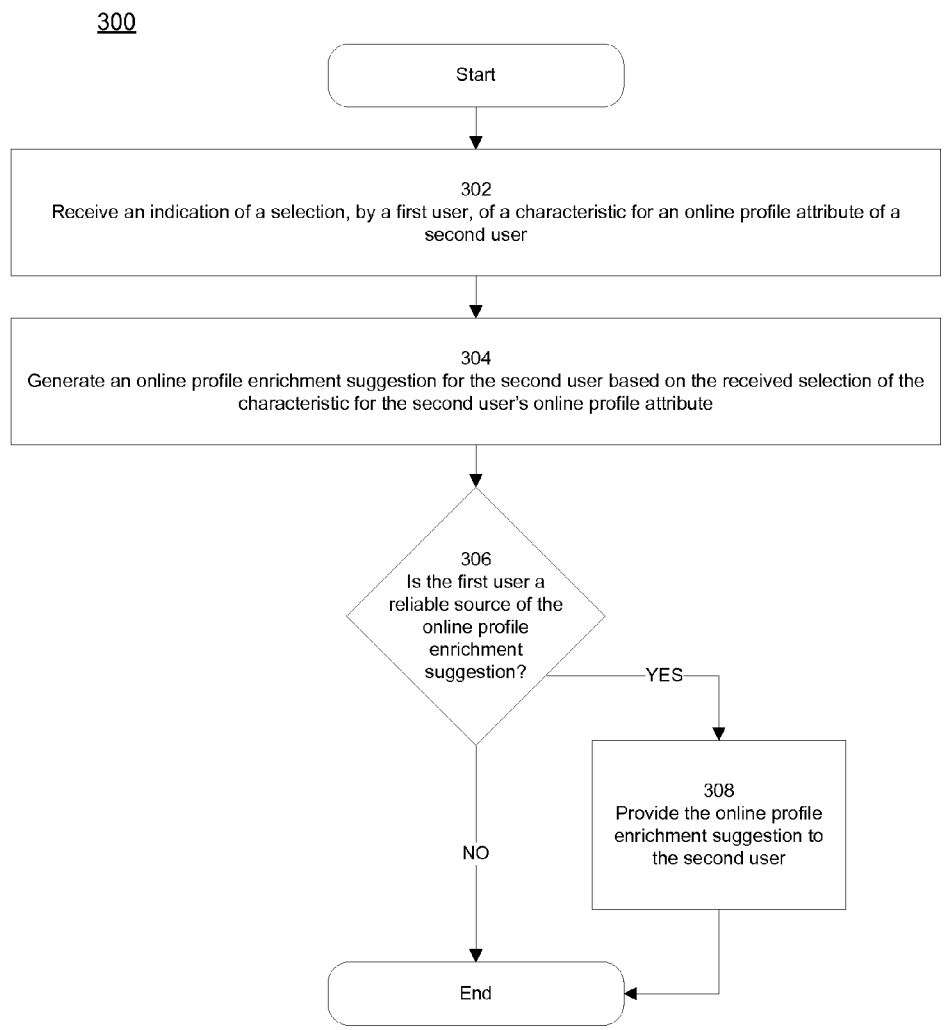
FIG. 3 illustrates a flow diagram of an example process for providing online profile enrichment suggestions for a user.

FIG. 3 illustrates a flow diagram of an example process 300 for providing online profile enrichment suggestions for a user. The process starts and at block 302, the system receives an indication of a selection, by a first user, of a characteristic for an online profile attribute of a second user. For example, the first user may be viewing content with which the second user interacted and select some or all of the content. The first use may likewise view content with which the second user has not interacted when selecting a characteristic for the online profile of the second user. The selected content may be a word, an image, a link, a post, etc. The selected content may be analyzed and one or more characteristics may be derived from the content.

At block 304 the system generates an online profile enrichment suggestion for the second user based on the received selection of the characteristic for the second user's online profile attribute. The suggestion includes the characteristic and may also include a reason for why the suggestion is generated. Generating the online profile enrichment suggestion may also include determining whether the characteristic is redundant for the second user's online profile. The system may suppress suggestions that are redundant. For example, text analysis may be performed to determine whether the characteristic is redundant.

At block 306, the system determines whether the first user is a reliable source of the online profile enrichment suggestion. That is, certain users may be better sources for making profile enrichment suggestions than other users. For example, a first user who has a high affinity score or a high vicinity score as it relates to the second user may be a better source of the suggestion than a user who rarely interacts with the second user. Likewise, a first user who rarely interacts with the second user, but is listed as a relative of the second user, may automatically be deemed a better source than another user who rarely interacts with the second user. Users may, therefore, be rated in relation to who is a reliable source.

The system may also determine whether the characteristic selected by the first user fits into an existing online profile attribute of the second user and, in a case the characteristic selected by the first user fits into the existing online profile attribute, add the selected characteristic to the existing online profile attribute of the second user. The system may also create an online profile attribute corresponding to the characteristic, in a case the characteristic selected by the first user does not fit into the existing online profile attribute of the second user.

At block 308, the system provides the online profile enrichment suggestions to the second user. The generated suggestion may be sent directly to the second user or the suggestion may initially be sent to the first user, for providing the suggestion to the second user. The suggestion may identify the first user or, according to an aspect of the disclosed technology, suggestions may also be made anonymously.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing display. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Figure 4:
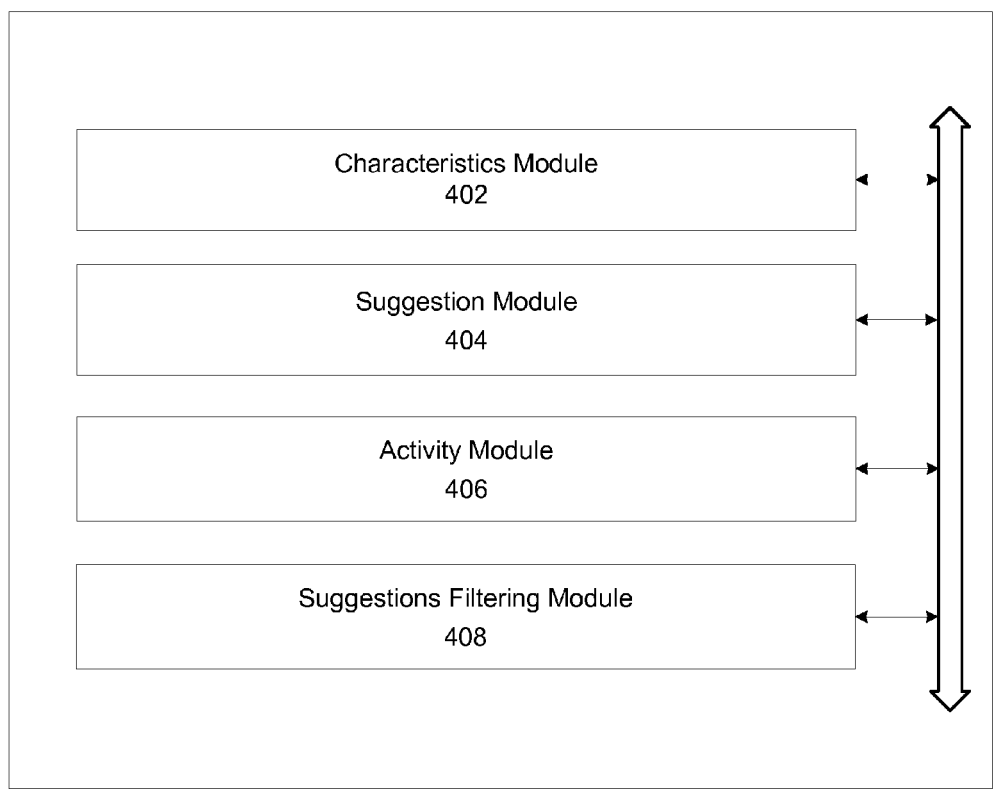
FIG. 4 conceptually illustrates an example of a system for providing online profile enrichment suggestions for a user.

FIG. 4 illustrates an example of system 400 for providing online profile enrichment suggestions for a user, in accordance with various aspects of the subject technology. System 400 comprises a characteristics module 402, a suggestion module 404, an activity module 406, a suggestions filtering module 408.

The characteristics module 402 is configured to analyze a plurality of instances of online activity to determine a characteristic that is likely to correspond to an online profile attribute of a user. The suggestion module 404 is configured to generate an online profile enrichment suggestion for the user based on the determined characteristic. The activity module 406 is configured to gather the plurality of instances of online activity associated with the user, the plurality of instances of online activity used for determining the characteristic that is likely to correspond to the online profile attribute of the user. The suggestion filtering module 408 is configured to determine one or more of, whether the determined characteristic is redundant for the online profile of the user and provide the online profile enrichment suggestion to the when the determined characteristic is not redundant, or whether the determined characteristic fits into an existing online profile attribute of the user and, in a case the determined characteristic fits into the existing online profile attribute, add the determined characteristic to the existing online profile attribute of the second user, otherwise, create a new online profile attribute corresponding to the determined characteristic.

These modules may be in communication with one another. In some aspects, the modules may be implemented in software (e.g., subroutines and code). In some aspects, some or all of the modules may be implemented in hardware (e.g., an Application Specific Integrated Circuit (ASIC), a Field Programmable Gate Array (FPGA), a Programmable Logic Device (PLD), a controller, a state machine, gated logic, discrete hardware components, or any other suitable devices) and/or a combination of both. Additional features and functions of these modules according to various aspects of the subject technology are further described in the present disclosure.

Figure 5:
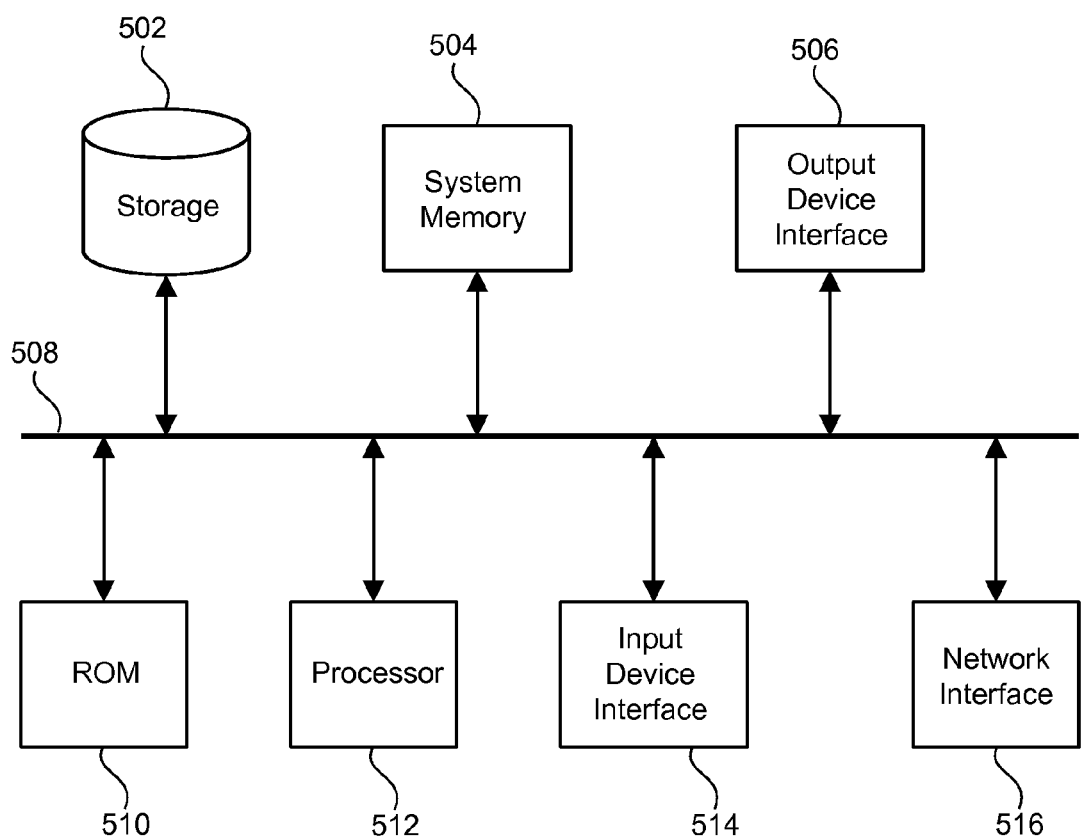
FIG. 5 conceptually illustrates an electronic system with which some aspects of the subject technology are implemented.

FIG. 5 conceptually illustrates an electronic system with which some aspects of the subject technology are implemented. Electronic system 500 can be a server, computer, phone, PDA, laptop, tablet computer, television with one or more processors embedded therein or coupled thereto, or any other sort of electronic device. Such an electronic system includes various types of computer readable media and interfaces for various other types of computer readable media. Electronic system 500 includes a bus 508, processing unit(s) 512, a system memory 504, a read-only memory (ROM) 510, a permanent storage device 502, an input device interface 514, an output device interface 506, and a network interface 516.

Bus 508 collectively represents all system, peripheral, and chipset buses that communicatively connect the numerous internal devices of electronic system 500. For instance, bus 508 communicatively connects processing unit(s) 512 with ROM 510, system memory 504, and permanent storage device 502.

From these various memory units, processing unit(s) 512 retrieves instructions to execute and data to process in order to execute the processes of the subject disclosure. The processing unit(s) can be a single processor or a multi-core processor in different implementations.

ROM 510 stores static data and instructions that are needed by processing unit(s) 512 and other modules of the electronic system. Permanent storage device 502, on the other hand, is a read-and-write memory device. This device is a non-volatile memory unit that stores instructions and data even when electronic system 500 is off. Some implementations of the subject disclosure use a mass-storage device (such as a magnetic or optical disk and its corresponding disk drive) as permanent storage device 502.

Other implementations use a removable storage device (such as a floppy disk, flash drive, and its corresponding disk drive) as permanent storage device 502. Like permanent storage device 502, system memory 504 is a read-and-write memory device. However, unlike storage device 502, system memory 504 is a volatile read-and-write memory, such a random access memory. System memory 504 stores some of the instructions and data that the processor needs at runtime. In some implementations, the processes of the subject disclosure are stored in system memory 504, permanent storage device 502, and/or ROM 510. From these various memory units, processing unit(s) 512 retrieves instructions to execute and data to process in order to execute the processes of some implementations.

Bus 508 also connects to input and output device interfaces 514 and 506. Input device interface 514 enables the user to communicate information and select commands to the electronic system. Input devices used with input device interface 514 include, for example, alphanumeric keyboards and pointing devices (also called "cursor control devices"). Output device interfaces 506 enables, for example, the display of images generated by the electronic system 500. Output devices used with output device interface 506 include, for example, printers and display devices, such as televisions or other displays with one or more processors coupled thereto or embedded therein, or other appropriate computing devices that can be used for running an application. Some implementations include devices such as a touch screen that functions as both input and output devices.

Finally, as shown in FIG. 5, bus 508 also couples electronic system 500 to a network (not shown) through a network interface 516. In this manner, the computer can be a part of a network of computers (such as a local area network ("LAN"), a wide area network ("WAN"), or an Intranet, or a network of networks, such as the Internet. Any or all components of electronic system 500 can be used in conjunction with the subject disclosure.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD- RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a device having a display device, e.g., televisions or other displays with one or more processors coupled thereto or embedded therein, or other appropriate computing devices that can be used for running an application, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that some illustrated steps may not be performed. Some of the steps may be performed simultaneously. For example, in certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa.

Headings and subheadings, if any, are used for convenience only and do not limit the subject disclosure.

What is claimed is:

1. A computer-implemented method comprising:
   determining that an amount of user information in one or more areas of a profile associated with a user is smaller than a threshold amount;
   gathering, in response to determining that the amount of user information in the one or more areas of the profile is smaller than the threshold amount, a plurality of instances of online activity associated with the user;
   determining that the plurality of instances of online activity relates to a characteristic that is likely to correspond to at least one of the one or more areas in the profile containing an amount of user information determined to be smaller than the threshold amount; and
   generating a profile enrichment suggestion associated with the characteristic for provisioning to the user, the characteristic being applied to the at least one of the one or more areas in the profile based on the generated profile enrichment suggestion.

2. The computer-implemented method of claim 1, further comprising:
   determining a contact associated with the user for making the generated profile enrichment suggestion to the user; and
   providing the generated profile enrichment suggestion to the determined contact for sending to the user.

3. The computer-implemented method of claim 1, wherein the profile enrichment suggestion is generated for the user in response to a request for the profile enrichment suggestion received from a contact associated with the user.

4. The computer-implemented method of claim 3, further comprising:
   providing the generated profile enrichment suggestion to the contact associated with the user for sending to the user.

5. The computer-implemented method of claim 1, wherein the profile enrichment suggestion is generated for the user in response to a request for the profile enrichment suggestion received from the user.

6. The computer-implemented method of claim 5, further comprising:
   providing the generated profile enrichment suggestion to the user.

7. The computer-implemented method of claim 1, wherein determining that the plurality of instances of online activity relates to the characteristic that is likely to correspond to at least one of the one or more areas in the profile sparse in information about the user comprises identifying a plurality of profile attributes in the profile.

8. The computer-implemented method of claim 7, further comprising determining the characteristic based on the plurality of profile attributes in the profile.

9. The computer-implemented method of claim 8, further comprising:
   determining whether the characteristic fits within at least one profile attribute of the plurality of profile attributes in the profile; and
   in a case that the characteristic does not fit within at least one profile attribute of the plurality of profile attributes, creating a new profile attribute for the user.

10. The computer-implemented method of claim 1, wherein the online activity of a user comprises at least one of public online activity of the user or private online activity of the user.

11. The computer-implemented method of claim 1, further comprising:
    generating an indication of a reason for why the profile enrichment suggestion is generated, the indication being included in the profile enrichment suggestion.

12. The computer-implemented method of claim 1, further comprising:
    determining, in response to determining that the amount of user information in the one or more areas of the profile is smaller than the threshold amount, that the profile is a candidate for receiving a profile enrichment suggestion.

13. A computer readable storage medium comprising instructions stored therein, which when executed by one or more processors, cause the one or more processors to perform operations comprising:
    receiving, from a first user, an indication of a selection of a characteristic for an attribute of a profile associated with a second user;
    determining that an amount of user information in one or more areas of the profile is smaller than a threshold amount;
    determining, in response to determining that the amount of user information in the one or more areas of the profile is smaller than the threshold amount, that the selection of the characteristic likely corresponds to at least one of the one or more areas in the profile containing an amount of user information determined to be smaller than the threshold amount;
    generating, in response to determining that the selection of the characteristic likely corresponds to at least one of the one or more areas in the profile containing an amount of user information determined to be smaller than the threshold amount, a profile enrichment suggestion for the second user using the received indication of the selection; and
    providing the profile enrichment suggestion to the second user, the characteristic being applied to the at least one of the one or more areas in the profile based on the generated profile enrichment suggestion.

14. The computer readable storage medium of claim 13, the operations further comprising:
    determining whether the first user is a reliable source of the profile enrichment suggestion; and
    providing the profile enrichment suggestion to the second user when the first user is determined to be a reliable source of the profile enrichment suggestion.

15. The computer readable storage medium of claim 13, the operations further comprising:
    determining whether the characteristic selected by the first user is redundant for the attribute of the profile associated with the second user; and
    providing the profile enrichment suggestion to the second user when the characteristic selected by the first user is not redundant.

16. The computer readable storage medium of claim 15, the operations further comprising:
    determining whether the characteristic selected by the first user fits into an existing profile attribute of the second user; and
    in a case that the characteristic selected by the first user fits into the existing profile attribute, adding the characteristic selected by the first user to the existing profile attribute of the second user.

17. The computer readable storage medium of claim 15, the operations further comprising:
    creating an profile attribute corresponding to the characteristic selected by the first user, in a case that the characteristic selected by the first user does not fit into the profile attribute of the second user.

18. A system comprising:

a memory storing executable instructions; and one or more processors configured to execute the executable instructions stored in the memory, which when executed by the one or more processors, cause the one or more processors to perform operations comprising:

determining that an amount of user information in one or more areas of a profile associated with a user is smaller than a threshold amount;

determining that a plurality of instances of online activity relates to a characteristic that is likely to correspond to at least one of the one or more areas in the profile containing an amount of user information determined to be smaller than the threshold amount; and generating a profile enrichment suggestion associated with the characteristic for provisioning to the user, the characteristic being applied to the at least one of the one or more areas in the profile based on the generated profile enrichment suggestion.

19. The system of claim 18, wherein the operations further comprise gathering the plurality of instances of online activity associated with the user.

20. The system of claim 18, wherein the operations further comprise:

determining one or more of, whether the characteristic is redundant for the profile of the user and provide the profile enrichment suggestion to the user when the characteristic is not redundant, or whether the characteristic fits into an existing profile attribute of the user; and in a case that the characteristic fits into the existing profile attribute, adding the characteristic to the existing profile attribute of the user, otherwise, create a new profile attribute corresponding to the characteristic.

21. The computer-implemented method of claim 12, further comprising:

determining that at least one area in the profile contains an amount of user information greater than the threshold amount; and suppressing a characteristic likely corresponding to the at least one area in the profile containing an amount of user information determined to be greater than the threshold amount as a candidate for the profile enrichment suggestion.

\* \* \* \* \*